(12) United States Patent
Cassar

(10) Patent No.: US 9,948,627 B1
(45) Date of Patent: Apr. 17, 2018

(54) SECURE ELECTRONIC DOCUMENT DELIVERY SYSTEM

(71) Applicant: Stephen Cassar, Del Mar, CA (US)

(72) Inventor: Stephen Cassar, Del Mar, CA (US)

( * ) Notice: Subject to any disclaimer, the term of this patent is extended or adjusted under 35 U.S.C. 154(b) by 69 days.

(21) Appl. No.: 14/329,918

(22) Filed: Jul. 12, 2014

Related U.S. Application Data

(60) Provisional application No. 61/845,509, filed on Jul. 12, 2013.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |

(52) U.S. Cl.
CPC .......... *H04L 63/08* (2013.01); *H04L 63/0853* (2013.01)

(58) Field of Classification Search
CPC ................. H04L 63/08; H04L 63/0853; H04L 2463/082; H04L 63/0838; H04L 63/18; H04L 9/3228
USPC .......................................................... 726/4
See application file for complete search history.

(56) References Cited

U.S. PATENT DOCUMENTS

| | | | | |
|---|---|---|---|---|
| 8,817,959 | B1 * | 8/2014 | O'Hanlon | H04M 11/066 379/88.13 |
| 9,124,641 | B2 * | 9/2015 | Baskaran | G06F 21/6209 |
| 2003/0208686 | A1 * | 11/2003 | Thummalapally | H04L 63/0442 713/193 |
| 2006/0020799 | A1 * | 1/2006 | Kemshall | H04L 12/58 713/170 |
| 2014/0068262 | A1 * | 3/2014 | Robertson | H04L 63/0428 713/168 |
| 2014/0165153 | A1 * | 6/2014 | Dabbiere | H04L 63/0281 726/4 |
| 2014/0201848 | A1 * | 7/2014 | Kulkarni | G06F 21/6218 726/27 |
| 2015/0271146 | A1 * | 9/2015 | Holyfield | H04L 63/0428 713/171 |
| 2016/0308840 | A1 * | 10/2016 | Munshi | H04L 63/0428 |

OTHER PUBLICATIONS

Stephen Crick, "Tokenless Authentication", Sep. 2011 (see attached document).*
Phil Underwood, "Tokenless Two Factor Authentication", Oct. 2012 (see attached document).*
Stephen Crick, "Tokenless Authentication", Sep. 2011 (see previously attached document).*
Phil Underwood, "Tokenless Two Factor Authentication", Oct. 2012 (see previously attached document).*

* cited by examiner

*Primary Examiner* — Carl G Colin
*Assistant Examiner* — Quy C Pham
(74) *Attorney, Agent, or Firm* — Schrantz Law Firm, PLLC; Stephen D. Schrantz

(57) ABSTRACT

The secure electronic document delivery system enables a sender to identify file information and recipient information to be sent to a recipient. The system utilizes an authentication system requiring access to two different authentication messages, both access to electronic mail and access to a message sent to the recipient's phone. The two authentication messages are transmitted via two different communication paths thus requiring the recipient to access two different types of communications. Without accessing both messages, the recipient cannot access the document identified by the sender.

1 Claim, 12 Drawing Sheets

Steve Schrantz

From: no-reply@sendcertified.com
Sent: Wednesday, July 10, 2013 7:21 PM
To: RECIPIENT EMAIL ADDRESS
Subject: You have received a link using sendcertified.com Hello RECIPIENT EMAIL ADDRESS Someone has sent you a secure link or message using SendCertified.

To retrieve it:

- 1) Please click this link or copy and paste this URL in your browser
  https://www.sendcertified.com/links/94?t_DaFbD8QQc1y92vQ_RnZLdA.
- 2) Then check your cell phone for a 5-Digit Secure Access Code we will send to you as a text message from our SendCertified server at (858) 905-5475.
- 3) Enter this 5-Digit Secure Access Code at SendCertified.com to retrieve the Secure Link.

Thank you!

The SendCertified.com team

FIG. 10

SECURE ELECTRONIC DOCUMENT DELIVERY SYSTEM

CROSS-REFERENCE TO RELATED APPLICATIONS

This application claims priority to and is a continuation-in-part of U.S. Patent Application No. 61/845,509 filed on Jul. 12, 2013 entitled SECURE ELECTRONIC DOCUMENT DELIVERY SYSTEM which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention is in the technical field of electronic file and message delivery. More particularly, the present invention is in the technical field of the secure transmission of links to sensitive electronic documents that are housed in a cloud-based internet environment.

Conventional methods of electronic document transmission involve emailing a link to the document or file using a standard plain text email. It is difficult to secure these email messages as they are relayed through multiple servers until they reach the intended recipient. Further, these emails are typically stored by each of the servers as the emails are relayed through for a long period of time. These documents are then archived further compromising these sensitive documents to unintended recipients for years.

The known art does not allow the security provided by the present invention. The present invention provides a solution that requires multiple authentication systems while avoiding storage of documents by third parties. Thus, the present invention allows a sender to maintain responsibility of the sender's files while avoiding storing sensitive information on a server or third party computer.

Therefore, the present invention is needed to provide a unique authentication system for sharing documents, information, and messages.

SUMMARY OF THE INVENTION

The present invention utilizes an authentication system implemented in both hardware and software that enables a sender to transmit information, documents, messages, etc. to a recipient. The present invention uses at least one computing device, such as a computer, server, tablet, smart phone, etc., accessible by the sender and the recipient.

The present invention transmits information and data through a network such as the Internet that allows communication between the sender and a server and between a server and the recipient. In one embodiment, the system communicates via at least two different messages transmitted through two different communication paths, electronic mail and a messaging service. The two different transmission paths of the communications require the recipient to access two different messages to enable access to the file. Accessing the two different messages requires two separate authentications for accessing the messages. Without accessing both messages, the recipient cannot access the file identified by the sender.

In one embodiment, the recipient may use a cellular phone capable of receiving messages, such as short message service, Apple's iMessage service, text messaging services, and other messaging services. The system of one embodiment of the present invention sends a message to the recipient that will provide the recipient with information required to access the document.

Software:

The present invention utilizes a computing device, including but not limited to a server, that receives information from the sender. The sender supplies the recipient information and the file information to the server. In one embodiment, the sender inputs the information via a web site to be transmitted to the server. Other embodiments may allow the user to input the information into a program or application to transmit and/or access the document. The server stores the file information and the recipient information within the server. The server then sends a first authentication message to the recipient identified in the recipient information. The recipient accesses the first authentication message which causes a second authentication message that includes an authorization code to be sent. The user enters the authorization code to access the document identified by the sender.

It is an object of the present invention to securely deliver documents and other information to a recipient.

It is another object of the present invention to avoid storage of a document by a third party.

It is another object of the present invention to require multiple authentications for identifying the recipient to confirm that the proper recipient receives the file.

It is another object of the present invention to require multiple communication paths to authenticate the identity of the recipient.

It is another object of the present invention to provide a secure messaging system.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 10 is a view of a first authentication message of one embodiment of the present invention;

DETAILED DESCRIPTION

Figure 1:
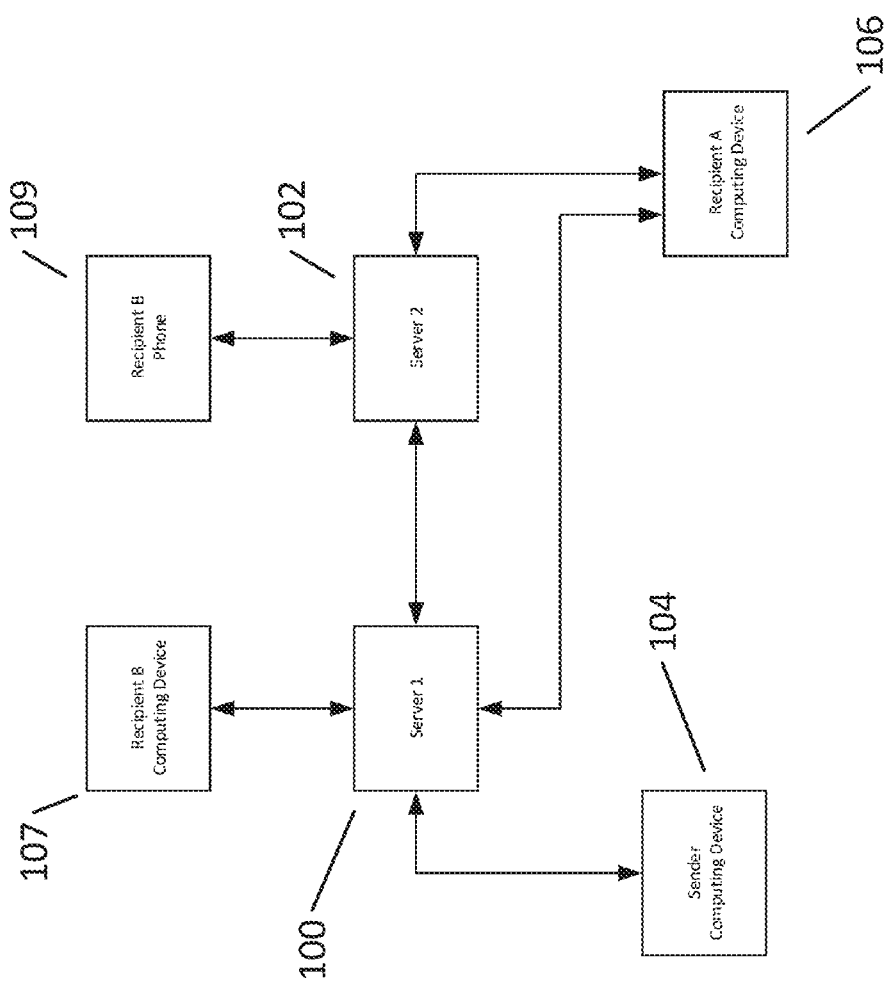
FIG. 1 is an environmental view showing one embodiment of the present invention.

FIG. 1 illustrates a diagram of one embodiment of the document delivery system and authentication system. The document delivery system uses at least one computing device, including but not limited to a server, such as server 100, potentially more servers 102, to accept information from both the sender 104 and recipient 106. The at least one server 100, 102 also communicates with the recipient to provide information to the recipient, such as the file and/or file location. An additional server 102 may provide the second communication to the recipient.

The document delivery system and authentication system of one embodiment of the invention includes at least one computing device such as computing device 104, 106, 107, 109, having a processor attached to memory, e.g., random access memory (RAM), and electronic storage media such as a hard disk, flash memory, etc. In one embodiment, the computing device includes an input device such as a touch screen, a mouse, a track ball, a track pad including the track pads found on Blackberry® phones, a button input system, a keyboard, and/or other known input systems that enable a user to enter information.

Continuing to refer to FIG. 1, a user, such as a sender or recipient, accesses the computing device, such as computing devices 104, 106, 107, 109. As stated above, the computing device 104, 106, 107, 109 may be a computer, a smart phone, a tablet pc, or other computer device. In one embodiment, the computing device 104, 106, 107, 109 may be a smart phone or other computing device that can access both servers 100, 102. In another embodiment in which a phone cannot access the Internet, the recipient, such as Recipient B, may need a phone such as Recipient's phone 109 to accept a message and Recipient's computing device 107 for accepting a message. These computing devices 104, 106, 107 can send and receive data from servers 100, 102. The network enables communication between the computing devices 104, 106, 107, phone 109, and servers 100, 102.

Figure 2:
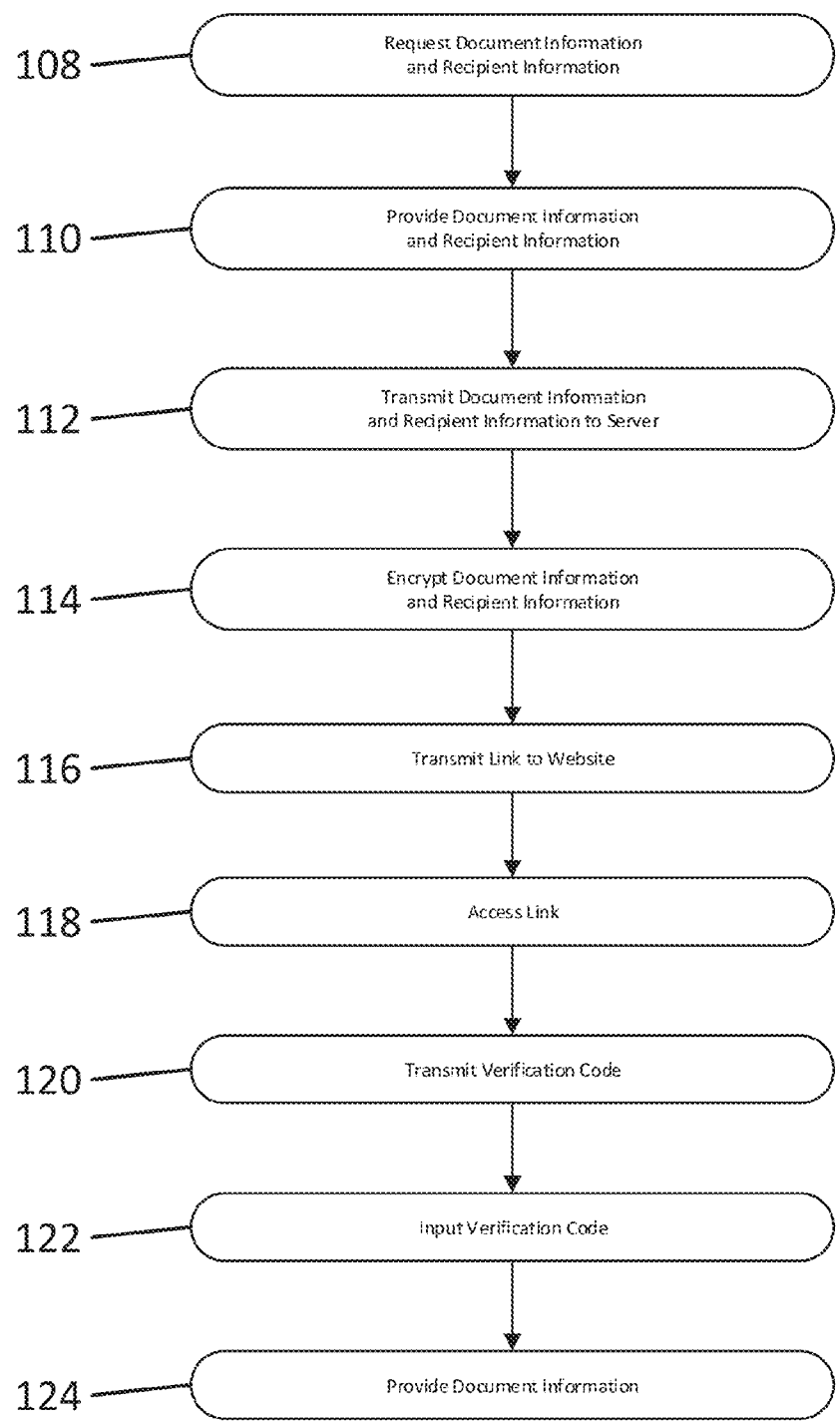
FIG. 2 is a flow chart of one embodiment of the present invention.

FIG. 2 shows a flow chart showing one embodiment of the present invention. In one embodiment, the sender accesses a website or a program that requests the file information and recipient information at Request Step 108. The sender 126 identifies whether the document will be a file, a website, or a message. If the document is a file or website, the sender 126 provides document link information, such as a unique resource locator (URL), address information, a web address, identifying the location of the file and/or website. This link information may refer to storage on the sender's system or another location in which the file or website is located. By storing the file and/or website on the sender's system, the user maintains control of the files to avoid relying on third party's interests in the sender's file and the security of the third party's system.

In another embodiment, the sender 126 may select to send a message to the recipient. When sending a message, the sender 126 enters the message into sender computing device 104. Instead of sending the message as an email which could be stored in different email servers while being transmitted to the recipient 128, the sender computing device 104 securely transmits the message as the file information to the server 100. The server 100 generates a web page with a document location. The document location created by server 100 is then sent to recipient 128 for accessing the message.

The sender 126 also provides recipient information at Step 110. The recipient information must include recipient contact information for contacting the recipient 128. The system requires at least one method of contacting the recipient. Another embodiment requires two sets of contact information providing two methods of contacting the recipient. The recipient information could also include the recipient name to personalize the messages sent to the recipient 128. The sets of recipient contact information may include the recipient's email address and a phone number. Other embodiments may include an additional phone number(s), a pager number, fax number, or other contact information for the recipient 128. Each set of contact information provides a communication path for contacting the recipient through a transmission delivery.

At Step 112, the sender computing device 104 securely transmits the file information and the recipient information to server 100. After receiving the file information and recipient information, the server 100 encrypts the file information and the recipient information at step 114 to be stored.

The server 100 then transmits a first authorization message to the recipient using the recipient information. The server 100 sends the first authorization message via a first communication path from a first set of recipient contact information. In one embodiment, this first authorization message is transmitted via electronic mail. The first authorization message includes a verification link, such as a URL or web address, sent to the recipient at Step 116 to be accessed at Step 118. In one embodiment, the verification link leads to a verification page, such as a verification website, for entry of an authorization code. The first authorization message may also include instructions informing the recipient 128 that a second authorization message, such as a text message, that provides an authorization code will be sent to the recipient 128 from a second communication path, such as a phone number. Providing such information enables the recipient to confirm that the authorization code was sent by the appropriate source and communication path. The instructions also provide information instructing the recipient of the location at which the authorization code should be entered. The second authorization message may be transmitted through the first communication path or a second communication path from a second set of recipient contact information.

The system validates the identity of the recipient at the time the recipient accesses the verification link found in the first authorization message. Accessing the verification link at step 118 provides the first authentication required to access the file as the recipient has proven that recipient has access to the first authorization message. To provide additional security, the document delivery system requires a second authorization level before providing the recipient 128 with access to the file.

After accessing the verification page from the verification link identified in the first authorization message, the recipient 128 is prompted to enter an authorization code to validate the second authorization level. The recipient 128, when accessing the verification link, accesses a server 100, 102 that activates the transmission of a second authorization message to the recipient 128. The second authorization message is sent from a source that was previously identified in the first authorization message. The recipient may verify the authorization code by comparing the source of the second authorization message to the source identified in the first authorization message. If the sources do not match, the recipient may ignore the authorization code. If the sources match, the recipient enters the authorization code to gain access. The server then provides the recipient with an access link to the file. In one embodiment, the server forwards the recipient to the file identified in the access link.

In one embodiment of the present invention, the first authorization message is sent through a first transmission delivery such as electronic mail. The second authorization message is sent through a second transmission delivery such as a phone messaging system such as short message service, Apple's iMessage service, text messaging services, and other messaging services. The first transmission delivery may be delivered by a different transmission service than the second transmission delivery. Transmitting the authorization messages via different communication paths requires that the recipient accesses two separate messages sent through two different transmissions. Thus, the recipient must authenticate the recipient's identity on two separate occasions. The two separate authentications by the recipient prior to providing access to the file greatly increases the security of the system.

Figure 3:
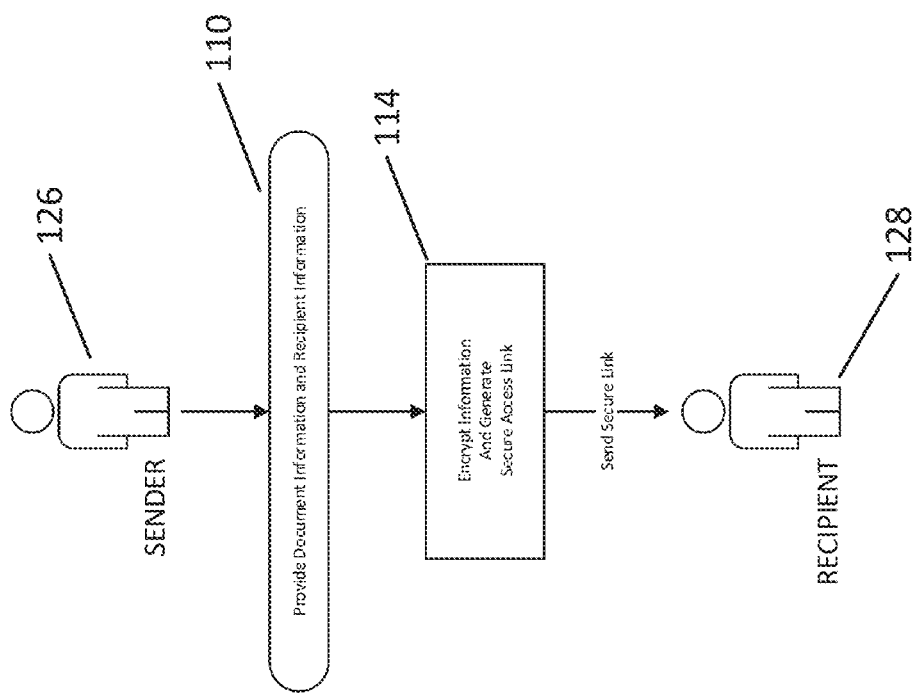
FIG. 3 is a flow chart showing one routine of one embodiment of the present invention.

FIG. 3 shows a method of securely sending a file from a sender 126 to a recipient. The sender 126 provides the file information, such as a URL, link, web address, or the message to be delivered via a generated file (the message file), and recipient information 110 to the routine 114. The system encrypts the file information and generates a secure access link that is sent to the recipient 128. The sender 126 provides the file information and recipient information at Step 110. As indicated above, the file information may be in the form of an address, a web address, a URL. The file information may also be a message entered into the system by the sender. The system then generates a message file that includes the message from the sender and creates a link to the document. After receiving the file information and recipient information, the system sends a secure link to the recipient 128 to be accessed by the recipient 128.

Figure 4:
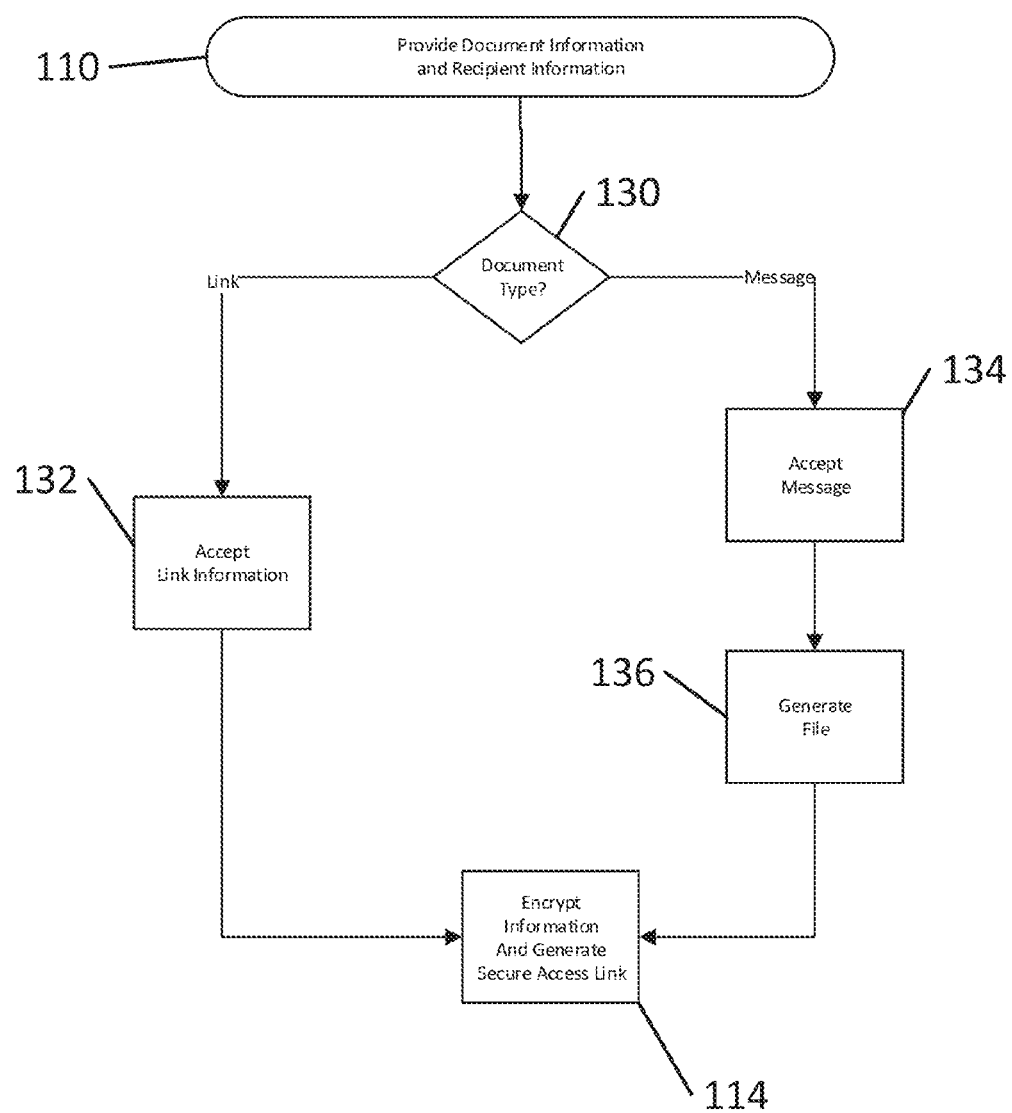
FIG. 4 is a flow chart showing one routine of one embodiment of the present invention.

FIG. 4 shows the process of providing the file information to the system. The system verifies the document type at Document Type Query 130. The system determines whether a file should be generated depending on the document type. If the user submits file link information as the file information, the system will accept the file link information at Step 132. The system will eventually forward the file link information provided by the sender to the recipient to access the document.

If the user submits a message as the file information, the user may input a message, select a saved message to be sent, and/or type a message. The server accepts the message at Step 134 from the sender 126. The system will then generate a message file at Step 136 that includes the message and provide an access link to the message file to the recipient. The system will then Encrypt the Information (both the recipient information and file information) and generate the Secure Access Link at Step 114.

Figure 5:
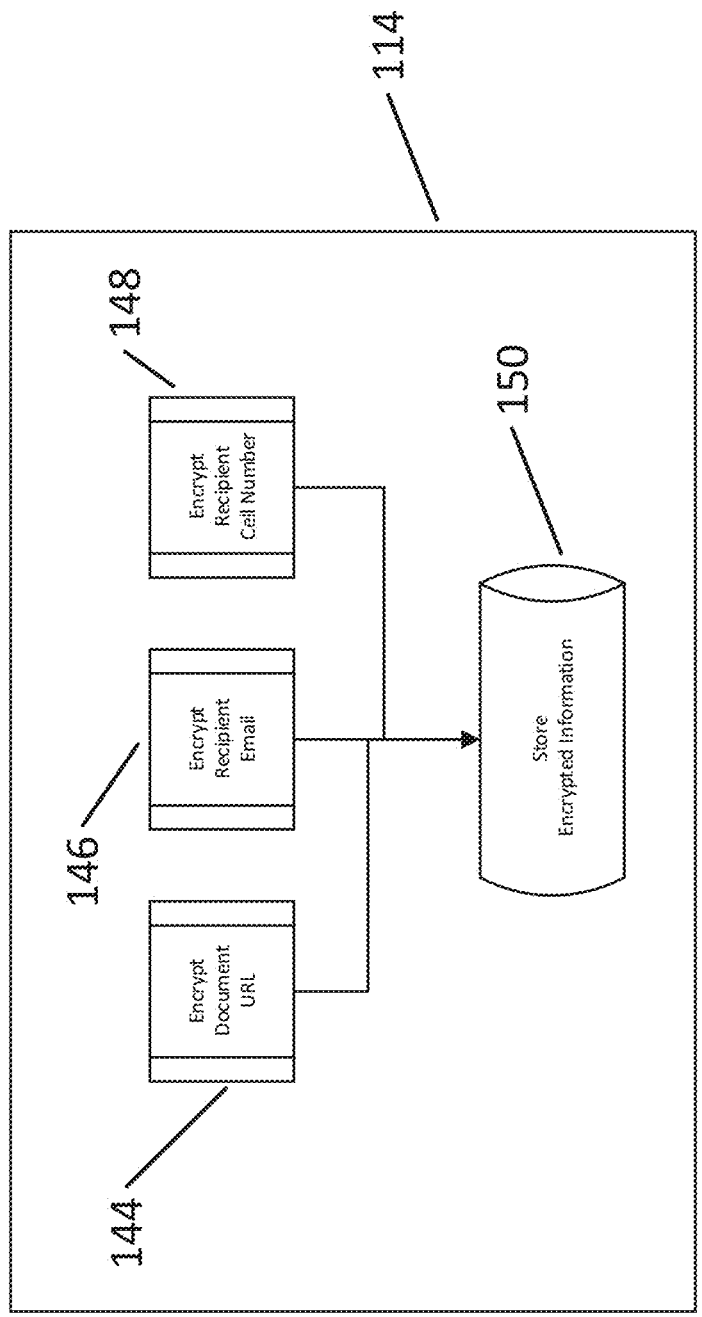
FIG. 5 is a view showing one routine of one embodiment of the present invention.

FIG. 5 shows the routine by which the system encrypts the information and generates a secure access link at Step 114. The system encrypts the File Link Information 144 and Encrypts Recipient's Information 146, 148. In one embodiment, the system encrypts the Recipient's contact information, including but not limited to the Recipient's email address and cell phone number. After encrypting the information, the system stores the encrypted information at Step 150.

Figure 6:
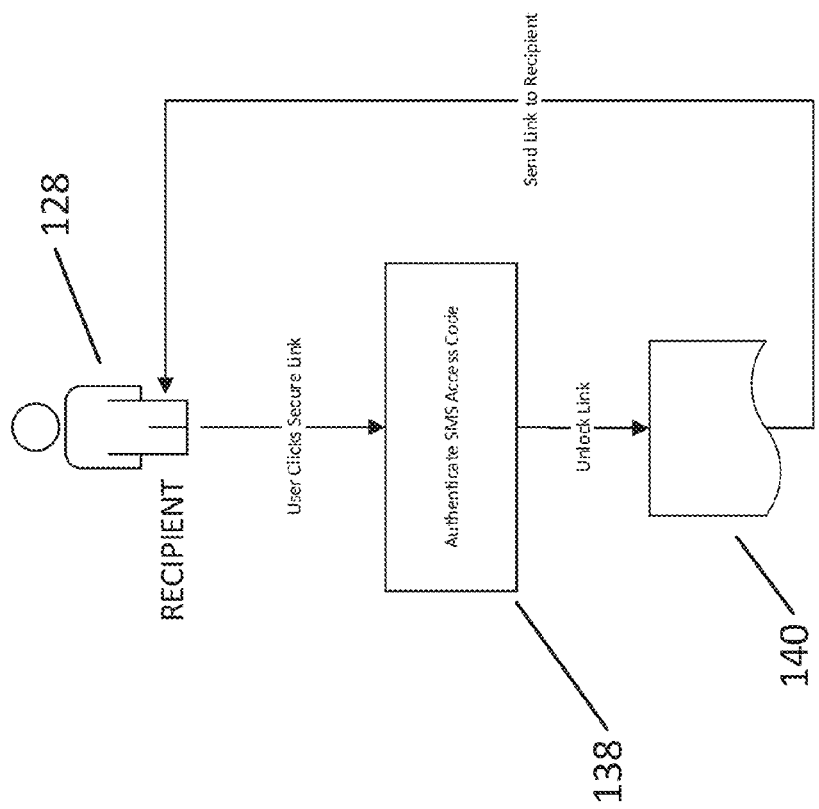
FIG. 6 is a flow chart showing one routine of one embodiment of the present invention.

FIG. 6 shows the routine by which the recipient 128 accesses the file information. The system has previously sent the first authorization message that includes a secure link. The recipient 128 clicks on the secure link to cause the authentication code to be sent to the recipient via the second authorization message. As previously indicated, the first authorization message is delivered via a different transmission system, such as a different communication path, than the second authorization message. The recipient 128 inputs the authorization code delivered in the second authorization message at the verification page from the verification link identified in the first authorization message. After the recipient 128 enters the proper authorization code, the system provides the recipient with the access link to provide the recipient with the file information and the file identified by the sender 126.

Figure 7:
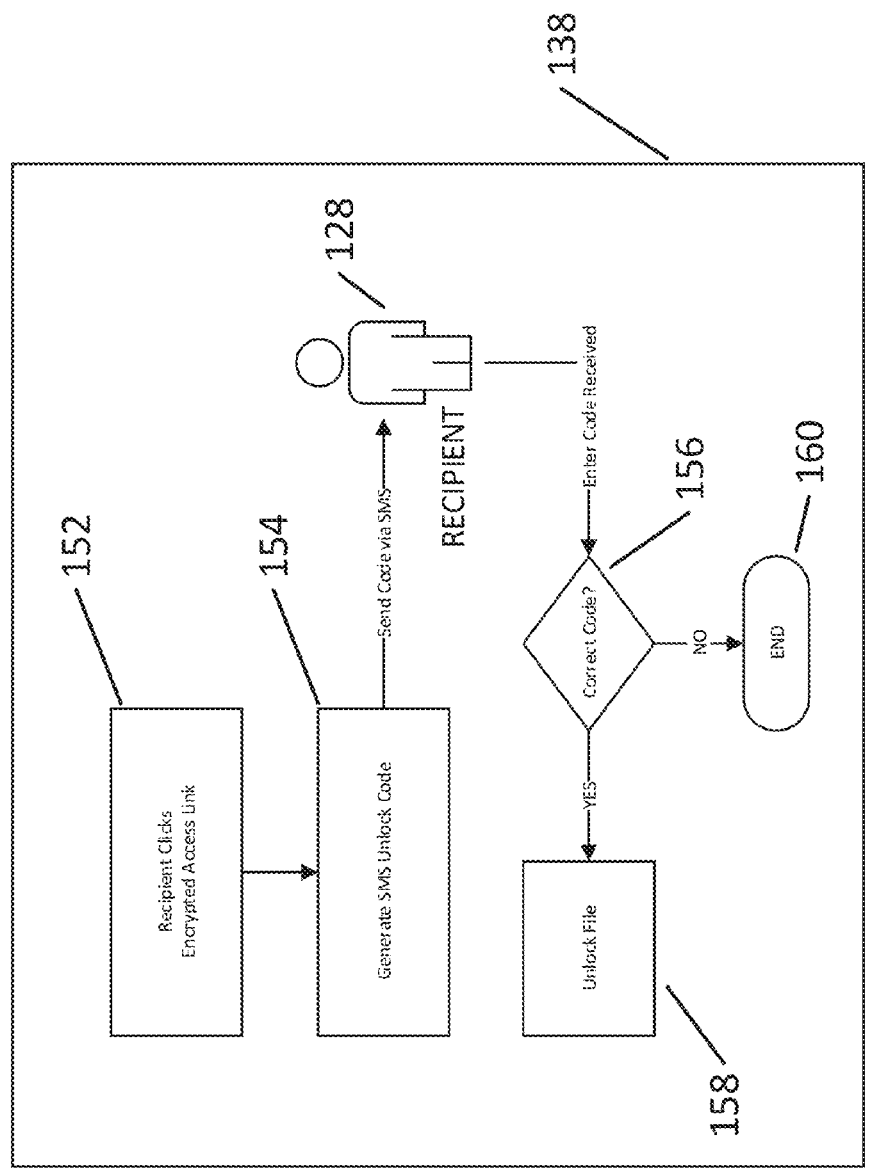
FIG. 7 is a flow chart showing one routine of one embodiment of the present invention.
Figure 8:
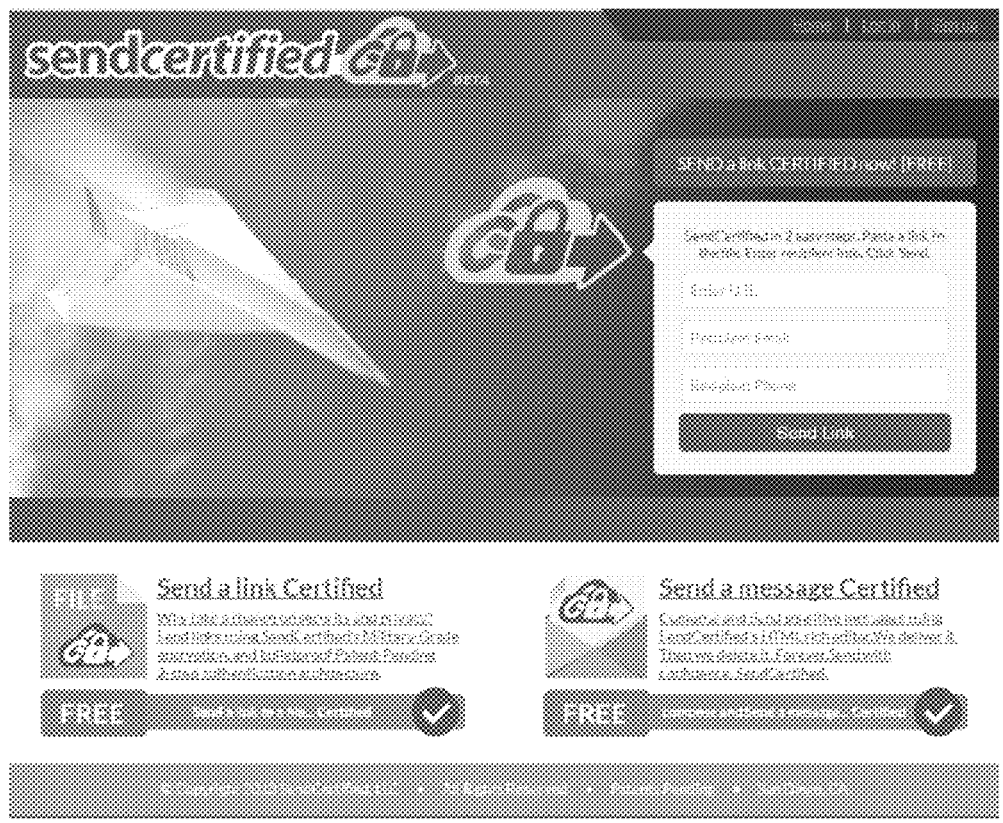
FIG. 8 is a view of an input screen accepting the file information and recipient information.
Figure 9:
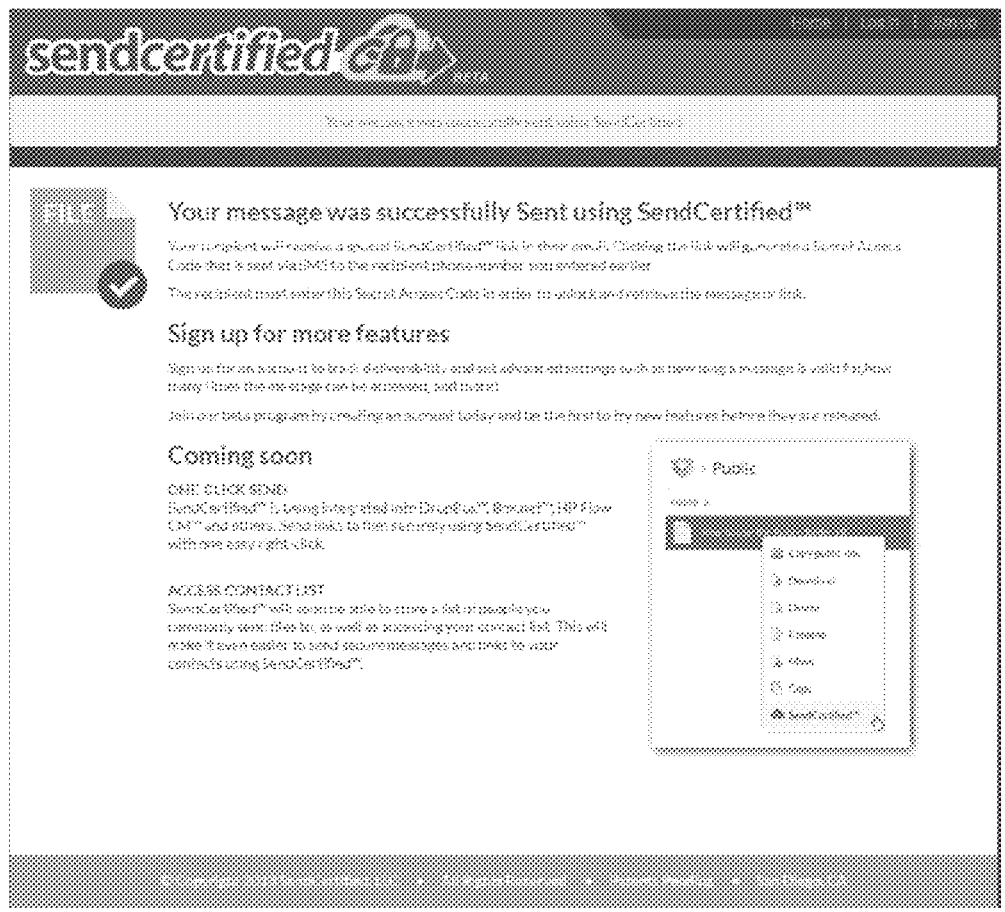
FIG. 9 is a view of a confirmation page indicating that the message was sent successfully.
Figure 11:
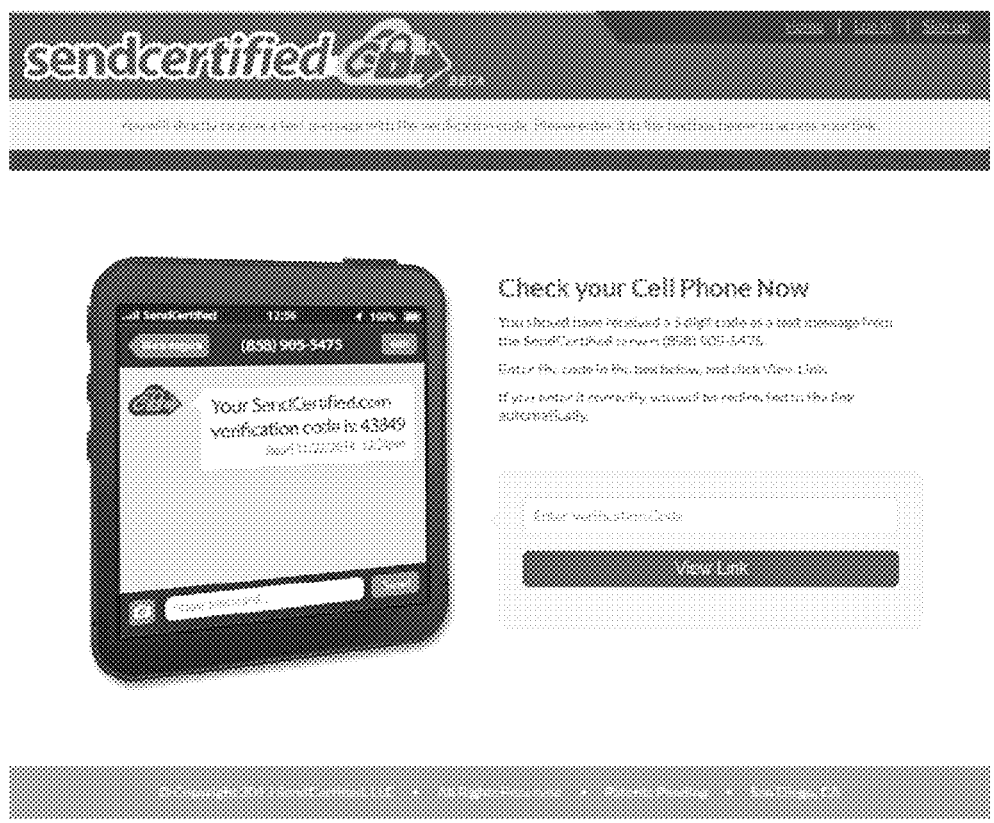
FIG. 11 is a view of a verification page.
Figure 12:
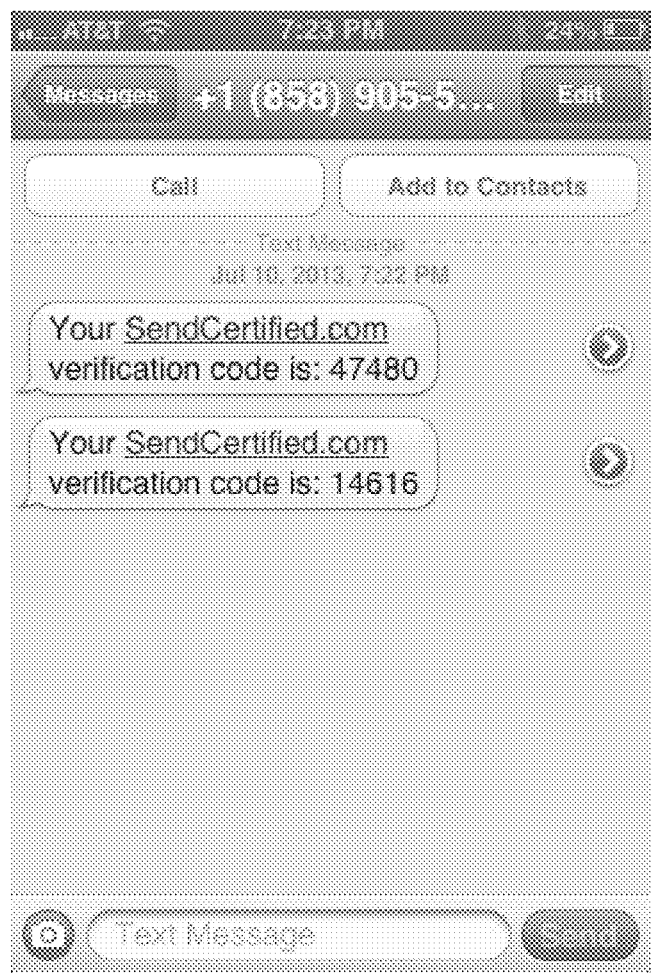
FIG. 12 is a view of a second authentication message of one embodiment of the present invention showing the authorization code to be entered into the verification page of FIG. 11.

FIG. 7 provides additional information concerning the Authenticate SMS Access Code 138. The recipient 128 clicks the encrypted access link at step 152 that is sent in the first authorization message. The system generates an authorization code that is associated with the recipient and the file information to be sent to the recipient at Step 154. The authorization code is then sent to the recipient 128. The recipient 128 enters the authorization code at the verification page from the verification link provided in the first authorization message. If the authorization code is incorrectly entered at Correct Code Query 156, the system does not allow access to the file. If the correct authorization code is entered at Correct Code Query 156, the system will decrypt the file information at Step 158 to provide the recipient with the file.

The system provides a method of requiring the user to access two separate authentication messages in order to provide access to a file, including but not limited to a document, file, message, image, other files, etc. One server or multiple servers may transmit the different authentication messages to the users. These authentication messages may be electronic mail or other messages. The use of two different delivery systems authenticates that the user has access to two separate communication systems that should only be accessible to the user. While the use of a web browser viewing a web site has been described above, it is understood that a user could access a program or application for transmitting and receiving the documents.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A secure electronic document delivery system for providing a file from a sender's computer system to a recipient via a computing system wherein the user accesses the file via an access link to the file on the sender's computer system, the delivery system comprising:

the sender storing the file at a first location on the sender's computer system;

the computing system encrypting an access link identifying the first location of the file to be transmitted to the recipient wherein the sender inputs the access link to the computing system;

the computing system storing the encrypted access link to the first location of the file;

the computing system associating the recipient with an email address for transmitting information to the recipient and a phone number for transmitting information to the recipient;

the computing system transmitting a first authorization message to the recipient via electronic mail, the first authorization message identifying a verification link to a verification page;

the computing system transmitting a second authorization message to the recipient via a text message to the phone number, the second authorization message providing an authorization code to the recipient wherein accessing the verification page triggers the transmission of the text message of the second authorization message with the authorization code to the recipient;

wherein the electronic mail to the recipient of the first authorization message identifies a phone number transmitting the text message of the second authorization message informing the recipient of the authorization code the computing system providing the recipient with the file available at the access link at the time the recipient accesses the access link such that the computing system provides access to the file to the recipient without uploading the file to a second location;

the computing system requiring entry of the authorization code at the verification page wherein entry of the authorization code at the verification page directs the recipient to the file located at the first location;

wherein the computing system decrypts the encrypted access link after the recipient enters the authorization code at the verification page.

* * * * *